United States Patent [19]

Burrell

[11] 4,333,257

[45] Jun. 8, 1982

[54] METHOD AND FINGER RING DEVICE FOR SNELLING A FISHHOOK

[76] Inventor: Gordon M. Burrell, 2813 Meadowbrook Dr., Fort Worth, Tex. 76103

[21] Appl. No.: 198,913

[22] Filed: Oct. 20, 1980

[51] Int. Cl.³ .............................................. A01K 97/06
[52] U.S. Cl. ..................................... 43/57.5 R; 30/298
[58] Field of Search ................... 43/57.5 R, 57.5 A, 1; 30/291, 298; 289/17

[56] References Cited

U.S. PATENT DOCUMENTS

| | | | |
|---|---|---|---|
| 124,464 | 3/1872 | Waters | 30/298 |
| 384,635 | 6/1888 | Maynard | 30/298 |
| 1,024,873 | 4/1912 | Westcott | 289/17 |
| 1,051,155 | 1/1913 | O'Connell | 289/17 |
| 1,091,412 | 3/1914 | Wild | 30/298 |
| 1,432,316 | 10/1922 | Binkis | 30/298 |
| 2,629,963 | 3/1953 | Youker | 43/57.5 R |
| 2,660,871 | 12/1953 | Anderson | 43/57.5 R |
| 2,769,272 | 11/1956 | Goldman | 43/57.5 R |
| 2,794,290 | 6/1957 | Hill | 43/57.5 R |
| 2,800,736 | 7/1957 | Beilharz | 43/1 |
| 2,843,961 | 7/1958 | Semple | 43/1 |
| 3,177,021 | 4/1965 | Benham | 289/17 |
| 3,292,298 | 12/1966 | Mullikin | 43/57.5 R |

FOREIGN PATENT DOCUMENTS 979796 1/1965 United Kingdom ................. 30/291

*Primary Examiner*—Jimmy C. Peters
*Assistant Examiner*—J. T. Zatarga
*Attorney, Agent, or Firm*—James E. Bradley

[57] ABSTRACT

A fishhook snelling device has features that allow a line to be easily and tightly secured to the fishhook. The snelling device consists of a ring with an aperture for insertion of the user's finger. A closed loop is located on the rim of the ring. The ring is to be worn with the closed loop on the palm side of the user's hand. The closed loop receives the hook portion of the fishhook while the user ties the line to the eye of the fishhook. The line is tensioned after tying, with the tension being transmitted through the ring to the user's hand to provide a tight knot.

5 Claims, 3 Drawing Figures

METHOD AND FINGER RING DEVICE FOR SNELLING A FISHHOOK

BACKGROUND OF THE INVENTION

This invention relates in general to devices for snelling fishhooks.

In fishing, fishhooks have to be frequently retied. With frequent casting, the line will fray near the hook, necessitating retying. Hooks are also lost from snagging objects.

The type of line being normally used is a monofilament plastic line. This line is slick and difficult to tie. To secure the knot, the fisherman must pull the line tightly while holding the hook. Often, this step results in the hook piercing the fisherman's fingers or hand. The hook is difficult to retain by hand while pulling tightly against it. This is particularly a problem when the hook and the user's hands are wet.

In the patented art, fishhook holders are proposed to solve this problem. In U.S. Pat. No. 2,700,840, a device that fits in the user's palm is shown. This device has a clip for retaining the hook while tying. In U.S. Pat. No. 3,177,021, a ring for insertion over the fingers is shown. A tube with a longitudinal slot is secured to the ring. The shank of the hook is adapted to be pushed inside the tube for facilitating tying. In U.S. Pat. No. 3,396,998, a hook shaped retainer is adapted to grip the fishhook for tying. The retainer is held by a tube that is gripped by the user. While these devices may be of assistance in tying hooks, a simpler more efficacious device is desired. U.S. Pat. No. 1,247,184 shows a simple crochet tension device, however it would not be suitable for snelling fishhooks.

SUMMARY OF THE INVENTION

The fishhook snelling device of this invention comprises a ring for insertion over one of the fingers of the fisherman. This ring has a closed loop located on the underside of the ring. In the preferred embodiment, the closed loop is another aperture formed in the ring parallel with the aperture that receives the finger. The loop is adapted to receive the hook portion of the fishhook and retain the fishhook while tying.

To use the device, the user simply slips the fishhook through the closed loop, then ties the fishhook loosely. Then the user pulls the line tightly, with the ring allowing tension to be placed in the line. The closed loop prevents the fishhook from dislodging during the tensioning step. After tensioning, the hook is simply removed from the closed loop.

DESCRIPTION OF THE PREFERRED EMBODIMENT

Figure 1:
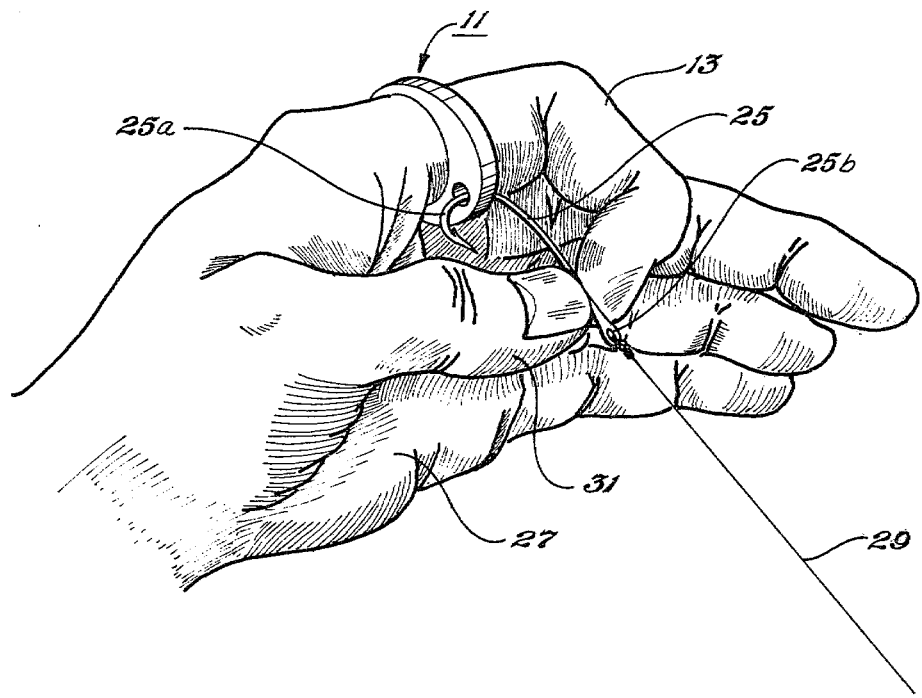
FIG. 1 is a perspective view of a fishhook snelling device constructed in accordance with this invention.
Figure 2:
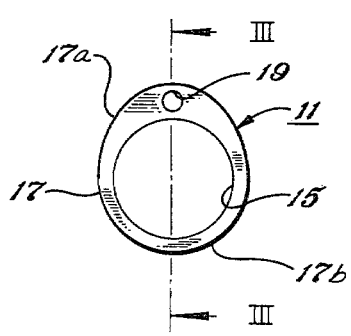
FIG. 2 is a front view of the fishhook snelling device of FIG. 1.

Referring to FIG. 1, a fishhook snelling device 11 is shown inserted over the index finger 13 of the user. Referring also to FIG. 2, the snelling device 11 has a first large aperture 15 that is circular and adapted to receive a finger of the user. The rim or ring 17 surrounding aperture 15 is of single piece construction. One portion of ring 17, designated by numeral 17a has a greater thickness, measured in a radial direction than the opposite portion 17b. In the preferred embodiment, the thickness of the portion 17a is about twice that of the radial thickness of the portion 17b.

Figure 3:
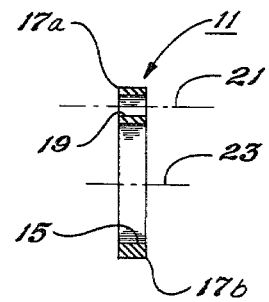
FIG. 3 is a sectional view of the fishhook snelling device of FIG. 1, taking along the lines of III—III of FIG. 2.

An aperture 19 is formed in the center of the thicker portion 17a. Referring to FIG. 3, aperture 19 has an axis 21 that is parallel with the axis 23 of the enlarged aperture 15. Aperture 19 is a fully closed loop for receiving the hook portion 25a of hook 25. The diameter of aperture 19 is substantially less than the diameter of aperture 15 and is about twice the diameter of the hook portion 25a of the largest hook that it is to receive.

In operation, the fisherman may wear the device 11 at all times or he may keep it in his tackle box for use only when tying. In any case, the device 11 may be inserted over any of the fingers that prove to be the most comfortable for the particular fisherman. The thicker portion 17a is rotated so that it is on the side of the palm 27 of the user's hand. Then the fishhook 25 has it's hook portion 25a inserted through the aperture 19. The eye 25b of the fishhook 25 will hang loosely away from the snelling device 11. The leader or fishing line 19 is inserted through eye 25b and tied into a loose knot. If desired, the fisherman may use his thumb 31 and index finger 13 to hold the hook to facilitate threading of the eye 25b. Then the line 19 is pulled tightly away from the device 11, placing tension on the knot. Aperture 19 will transmit tension from the hook to the snelling device and to the user's hand. This allows a substantial amount of tension placed on the knot, preventing it from loosening while in use.

The invention has significant advantages. Being of single piece construction, it is inexpensive to produce. It greatly simplifies the task of tying a fishing line to a fishhook, and allows substantial tension to be placed on the knot to assure that it is properly tied.

While the invention has been shown in only one of its forms, it should be apparent to those skilled in the art that it is not so limited, but is susceptable to various changes and modifications without departing from the spirit of the invention.

I claim:

1. A method for snelling a fishhook, comprising:
   providing an annular member with an aperture for insertion over a user's finger; the aperture having an axis;
   providing a closed loop on the annular member spaced from the aperture;
   inserting the annular member over the finger of the user, with the closed loop on the palm side of the user's hand;
   inserting a hook portion of a fishhook into the loop to retain the fishhook;
   tying a line to an eye of the fishhook while the fishhook is retained by the loop, creating a knot;
   tensioning the knot while the fishhook is retained by the loop by pulling the line away from the annular member in a radial direction with respect to the axis of the aperture; and
   withdrawing the fishhook from the loop.

2. The method according to claim 1 wherein the fishhook has a shank that is supported by a thumb and finger of the hand wearing the annular member while tying the line to the fishhook.

3. A fishhook snelling device comprising:

an annular member having an aperture therethrough sized for insertion over a user's finger;

a rigid closed loop located on the member and spaced from the aperture for receiving a hook portion of the fishhook to retain the fishhook while tying it to a line, the loop having a diameter too small for receiving a finger, the loop and the aperture having parallel axes.

4. The device according to claim 3 wherein: the member is of single piece construction, with the hole extending therethrough, the member having a continuous smooth periphery to enable the member to be worn with the hole on a palm side of the user's hand.

5. The fishhook snelling device according to claim 4 wherein the thickness of the annular member, measured radially, is greater in the portion containing the hole than in the remaining portion of the annular member.

* * * * *